United States Patent

[11] 3,596,390

| [72] | Inventor | John Scalice<br>West Paterson, N.J. |
|------|----------|-------------------------------------|
| [21] | Appl. No. | 773,494 |
| [22] | Filed | Nov. 5, 1968 |
| [45] | Patented | Aug. 3, 1971 |
| [73] | Assignee | Clinique Laboratories, Inc.<br>New York, N.Y. |

[54] MANUALLY OPERABLE COMPUTER
10 Claims, 4 Drawing Figs.

| [52] | U.S. Cl. | 40/65, 35/59 |
|------|----------|--------------|
| [51] | Int. Cl. | G09f 11/30 |
| [50] | Field of Search | 40/65; 35/59 |

[56] References Cited
UNITED STATES PATENTS

| 302,695 | 7/1884 | Wayer | 40/65 |
| 1,811,778 | 6/1931 | Bowen | 40/65 |
| 2,349,070 | 5/1944 | Axelrod | 40/65 |
| 2,522,723 | 9/1950 | Rookyard | 35/28.5 |
| 2,543,609 | 2/1951 | Stark | 40/65 UX |
| 2,610,792 | 9/1952 | Kaufman | 40/65 X |
| 2,770,900 | 11/1956 | Smith | 40/65 |
| 2,914,865 | 12/1959 | Hall | 40/65 X |

*Primary Examiner*—Robert W. Michell
*Assistant Examiner*—Richard Carter
*Attorney*—Blum, Moscovitz, Friedman, Blum & Kaplan ABSTRACT: A manually operable computer used, for example, for cosmetic purposes to indicate directions for proper procedure in accordance with a predominating degree of a number of different variable factors. A plurality of indicating means are provided for indicating different degrees of a plurality of variable factors, respectively. The indicator means are manually operable and each include a manually shiftable indicating strip having a plurality of differently colored areas which are respectively indicative of the different degrees of a given variable factor. The number of colored areas of any one strip matches those of all of the others, and the several indicating means respectively include indicating locations at which selected colored areas are located. With the selected colored areas thus situated at these indicating locations, it is possible to determine which of the colors predominates over the others, and a further means is provided for giving directions as to procedures to be taken in connection with which one of the colors predominates.

PATENTED AUG 3 1971  3,596,390

INVENTOR.
JOHN SCALICE

BY

Blum, Moscovitz, Friedman, Blum & Kaplan
ATTORNEYS

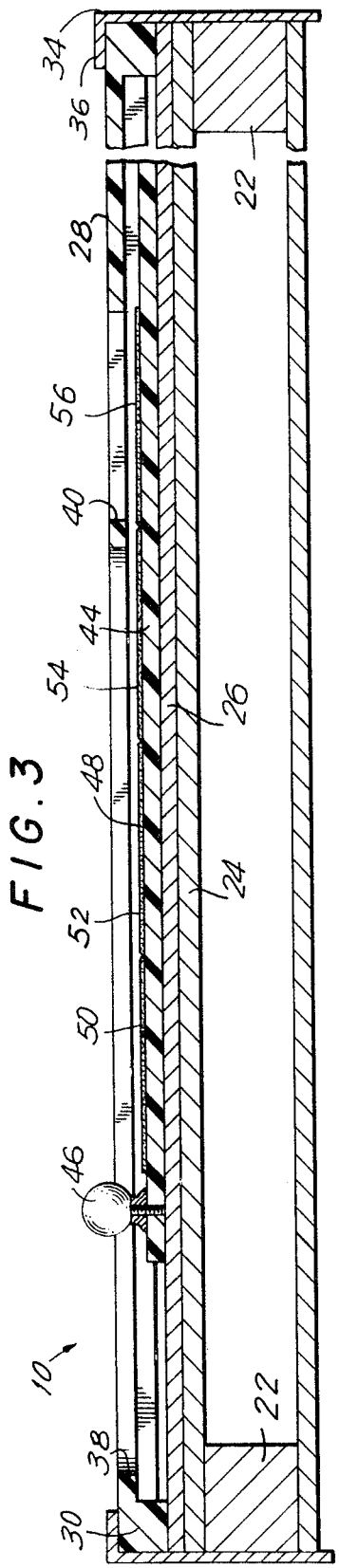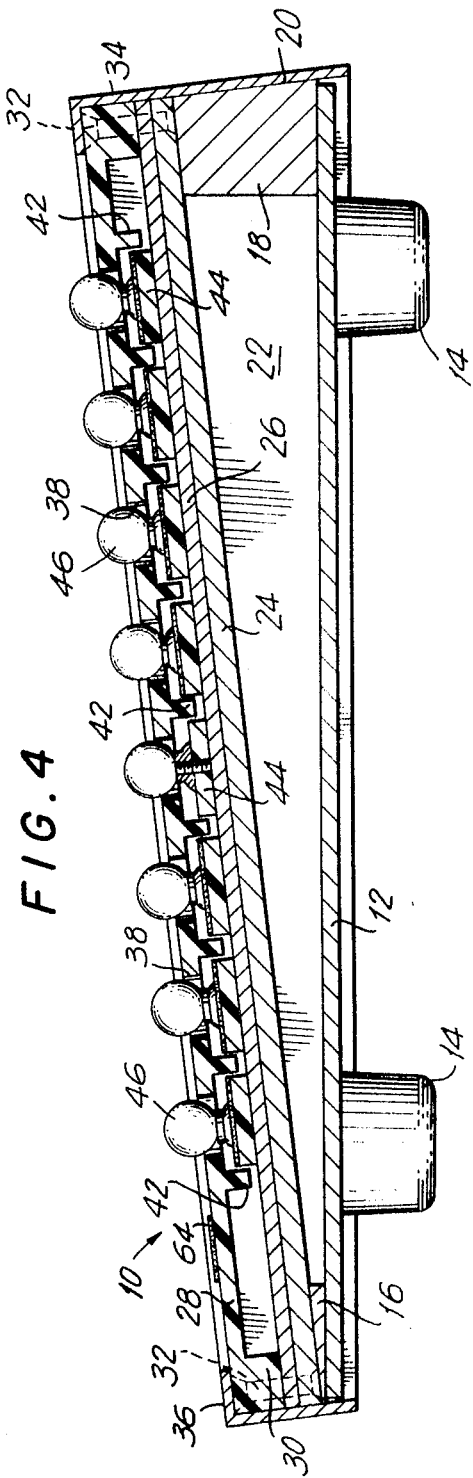

MANUALLY OPERABLE COMPUTER

BACKGROUND OF THE INVENTION

The present invention relates to computers.

In particular, the present invention relates to relatively simple, manually operable computers.

There are certain fields where in order to determine the proper way to proceed it is necessary to take into consideration not only a number of different factors but also the degrees of these factors, in the case where the several factors are variable in nature. For example, in the case of determining what cosmetics should be applied, it is necessary to take into consideration not only such factors as color of eyes, natural coloring, skin coloring, pore size, etc., but also the different degrees of these factors. For example, in the case of a skin which is relatively oily, with relatively few surface facial lines, and which tans when exposed to the sun, it is advisable, when certain additional factors are present, such as a medium pore size, and a medium skin coloring without sun tan, to provide one type of makeup, whereas other degrees of these several factors will call for another type of makeup. Because of the relatively large number of variable factors which must be considered, it is a difficult matter to arrive at a proper evaluation of what particular type of makeup will be best when taking into consideration the various degrees of the several variable factors.

At the present time, a large amount of time and effort are required in order to achieve a proper analysis from which the proper makeup can be determined, and this requires the services of skilled technicians.

SUMMARY OF THE INVENTION

It is accordingly a primary object of the present invention to provide a computer which will enable even relatively unskilled personnel to make an accurate analysis of a number of variable factors of the above general type, so as to determine the proper procedure to take in connection with the analysis.

Another object of the invention is to provide a computer of this type which is of an exceedingly simple and inexpensive construction and which can be very easily manipulated in order to achieve the desired analysis.

Furthermore, it is an object of the invention to provide a computer of this type which is particularly suitable for use in connection with cosmetics.

Also, it is an object of the invention to provide a simple relatively inexpensive structure which is very easily manipulated and which will operate reliably over a long period of time in order to achieve the desired results.

In accordance with the invention, the computer includes a plurality of indicating means for respectively indicating several variable factors, with each indicating means having an indicia carrying member which is manually shiftable and which has differently colored areas respectively indicating different degrees of a given variable factor. The several indicating means also include a plurality of indicating locations where a selected degree of the different factors can be situated. The number of degrees and indicia of any one indicating means match those of all of the other indicating means, so that in accordance with the selection which is made, there will be at the indicating locations degree indications for the several factors with several of the indicated degrees matching each other. It thus becomes possible to determine at the indicating locations which of the degrees of the several factors predominates over the others, and in accordance with this predominating degree it is possible to determine what further procedure should be taken.

BRIEF DESCRIPTION OF DRAWINGS

The invention is illustrated by way of example in the accompanying drawings which form part of this application and in which:

FIG. 3 is a longitudinal sectional elevation fragmentarily illustrating the structure of FIGS. 1 and 2 and taken along line 3-3 of FIG. 1 in the direction of the arrows; and FIG. 4 is a transverse sectional elevation taken along line 4-4 of FIG. 1 in the direction of the arrows and showing the structure on a scale which is enlarged as compared to FIG. 1.

DESCRIPTION OF A PREFERRED EMBODIMENT

The present invention is based upon the discovery that for a given degree of a number of different variables, which may be unrelated, a certain specific type of makeup is most suitable. For example, with a relatively oily skin of medium pore size, for an individual having hazel eyes and light brown natural coloring, with few surface facial lines and a tendency to tan when exposed to the sun, one specific type of makeup is suitable, whereas with an individual having many surface facial lines and always tending to burn when exposed to the sun, with a relatively dry skin and no tendency to break out while having a pore size which is practically invisible, another type of makeup will be most suitable, this latter type also being suitable for a blond natural coloring with blue eyes and a very fair skin coloring.

Figure 1:
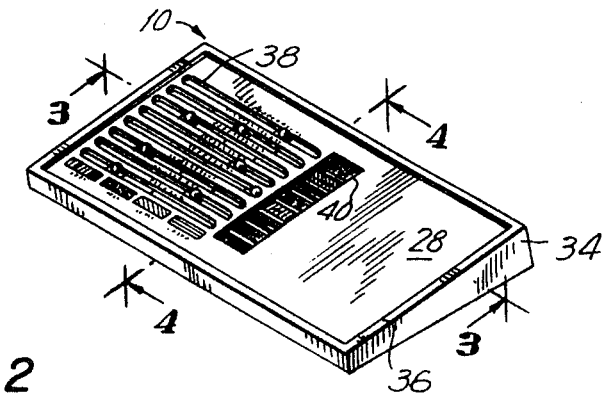
FIG. 1 is a perspective illustration of a computer constructed in accordance with the invention.

Referring to the drawings, it will be seen from FIGS. 1, 3, and 4 that the computer 10 of the present invention which is illustrated therein includes a flat bottom wall or base 12 supported by suitable feet 14 (FIG. 4). There are four feet 14 respectively situated in the regions of the corners of the rectangular horizontal plate 12.

Along its front longitudinal edge, the plate 12 carries an interior supporting member 16 of wedge-shaped cross section, as shown at the left of FIG. 4. Also, along its rear longitudinal edge the plate 12 carries a rear elongated support member 18 also of tapered cross section, and the rear surface 20 of the support member 18 is inclined upwardly and forwardly, as is indicated at the right of FIG. 4. Along its opposed side edges, the plate 12 carries a pair of supporting strips 22 of wedge-shaped configuration terminating at their front ends in tips matching the cross section of the strip 16 and located at the ends thereof and terminating at their rear end in portions of the same cross section as the member 18 and situated at the ends of the latter. If desired the parts 22, 16 and 18 may form a single, one-piece rectangular frame providing an upper surface which is directed upwardly but inclined forwardly.

On this upper surface there is supported a plate 24 which is covered by a sheet 26 of any material of a relatively low coefficient of friction, such as a sheet of a suitable metal or plastic. The top surface of the sheet 26, whose configuration matches that of the plate 24, forms part of a guide means which includes an upper guide component 28 having at its periphery a downwardly directed flange 30 directly engaging the top surface of the sheet 26 at the region of the periphery of the latter. Suitable rivets 32 maintain the assembly of plate 24, sheet 26, and component 28 connected together to form a single unitary structure. This entire assembly is surrounded by a peripheral frame structure 34 having front and rear sidewalls which are inclined upwardly and forwardly as indicated in FIG. 4, vertical side walls, as is apparent from FIG. 3, and an upper inwardly directed peripheral flange 36 which overlaps the top surface of a component 28. The peripheral frame 34 may be fixed in position in any suitable way as by being adhered or otherwise fastened to the member 18 and the side members 22.

Figure 2:
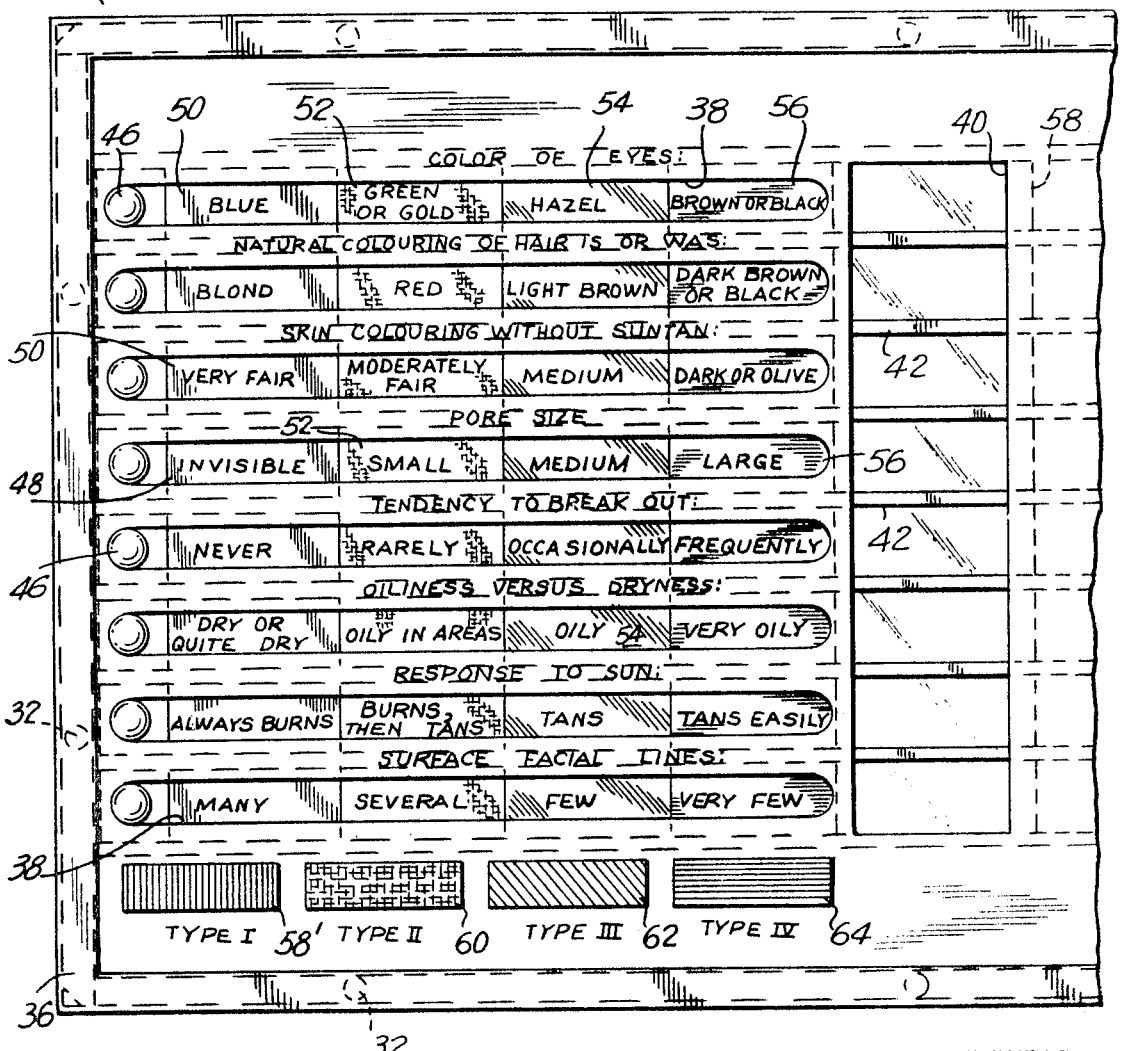
FIG. 2 is a fragmentary top plan view of the computer of FIG. 1 showing the structure at a scale which is enlarged as compared to FIG. 1.

The component 28 of the guide means has its wall which is surrounded by the flange 30 formed with a plurality of straight parallel elongated slots 38 shown most clearly in FIG. 2. These slots are all of the same length and are arranged one above the other in a vertical row while extending horizontally, as is apparent from FIGS. 1 and 2. Just to the right of the slots 38 of the wall of component 28 is formed with an elongated rectangular slot 40 which extends vertically along the entire row of horizontal slots 38 and which has a width substantially smaller than the length of the slots 38. It is to be noted that the term "vertical" is used in the sense of extending between the top and bottom of the computer, which is to say between the rear and front thereof.

The component 28, which may be formed of any suitable plastic, for example, has integrally formed therewith a plurality of horizontally extending parallel ribs 42 which extend across the opening 40 and which extend all the way across the entire computer from the flange 30 at one side of the frame 34 to the flange 30 at the other side of the frame 34.

This guide means which is formed by the component 28 and the sheet 26 serves to guide a plurality of manually shiftable elongated strip members of a plurality of manually operable indicating means. Thus, except for the front and rear guide ribs 42, each guide rib is situated between a pair of indicating strips 44 so that, in the manner shown most clearly in FIG. 4, the several strips 44 are guided for longitudinal shifting movement on the upper surface of the sheet 26 horizontally to the right and left. At their left ends, as viewed in FIGS. 2 and 3, the several strips 44 are respectively provided with knobs 46 extending upwardly through the slots 38 so as to be accessible to the operator. Thus, the operator can manually shift the several strips 44 longitudinally along the guide ribs 42 in order to situate selected parts of the strips at the opening 40 which defines for the several indicating means a plurality of indicating locations.

Each strip has glued to its top surface, or otherwise fastened thereto, an elongated strip of indicia-carrying plastic 48 or the like, and all of these plastic strips 48 have identically colored areas. Referring to FIG. 2, each strip 48 has a left elongated area 50 which is colored pink, a left intermediate colored area 52 which is colored yellow, a right intermediate colored area 54 which is colored green, and a right end colored area 56 which is colored blue. Thus, each strip 48 has colored areas identical with those of the other strips, and the successive colored areas 50, 52, 54, and 56 are situated one directly next to the other and are all of the same length. This length is approximately equal to the width of the slot 40, so that between the ribs 42 where they extend across the slot 40 a plurality of indicating locations are provided where a selected one of the colors of the strips can be located. The several strips 44 are initially in the positions indicated in FIG. 2 where the knobs 46 are located at the left ends of the slots 38, while the right ends 58 of the several strips 44 are situated just to the right of the slot 40.

The component 28 of the computer has at its upper surface printed indicia or the like forming a labelling means for indicating the several variable factors, and the printed matter indicating the several variable factors is situated over the several slots. Thus, in the particular example illustrated, there is situated over the uppermost or rearmost slot the heading "COLOR OF EYES." Over the next slot the component 28 has printed thereon "NATURAL COLORING OF HAIR." In the same way the successive next lower slots have situated thereover the headings "SKIN COLORING WITHOUT SUNTAN," "PORE SIZE," "TENDENCY TO BREAK OUT," "OILINESS VS. DRYNESS," "RESPONSE TO SUN," and "SURFACE FACIAL LINES."

In the several colored areas of the strips 48 there are indications of the degrees of these variable factors. Thus, at the top strip under the heading "COLOR OF EYES," the pink area 50 has an indication of blue eyes, the yellow area 52 has an indication of green or gold eyes, the green area 54 has an indication of hazel eyes, while the blue area 56 has an indication of brown or black eyes. In the same way these different areas will indicate color of hair, whether the skin coloring is very fair, moderately fair, medium, or dark or olive. With respect to the pore size, the several colored areas indicate whether the pores are invisible, small, medium or large. With respect to the tendency to break out, the several colored areas indicate never, rarely, occasionally, and frequently. Similar degree indications are given for the several colored areas of the remaining variable factors, as indicated in FIG. 2.

It thus becomes possible for the operator to shift the individual indicating members until there is aligned with the slot 40 a selected indication of the degree of each of the variable factors. Of course, it will rarely happen that any one individual will have the same color appearing for all of the variable factors along the slot 40. However, it will almost always happen that one of the colors will predominate over the others. After the several indicating strip members have been shifted, one of the colors of the several indicating means will predominate over the others since there will be more of this one color then any of the other colors.

A means is provided for giving directions for further procedures in accordance with that one of the colors which predominates. This means takes the form of several strips 58', 60, 62, and 64 situated beneath the slots and respectively having the colors pink, yellow, green, and blue, matching those of each indicating means. Under these strips 58'—64 there are indications of types I—IV, and these indicate different cosmetics. Thus, type I cosmetics will be used in those cases where the pink color predominates at the slot 40. In other words after the several strips 44 have been shifted to situate selected colors at the locations defined by the slot 40, the different colors will be counted up, and that color which is present in a number greater than any of the other colors will indicate predominating color. If this color should be pink, then type I cosmetics will be used, while if the predominating color is yellow, then type II cosmetics will be best, and so on. It therefore becomes possible with the computer of the invention to quickly and easily analyze the different degrees of the several variable factors so as to determine, without the exercise of any particular judgment or skill, which one of the group of different sets of cosmetics are most suitable for a given individual.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is to be understood that the following claims are intended to cover all of the generic and specific features of the invention herein described, and all statements of the scope of the invention which, as a matter of language, might be said to fall therebetween.

What I claim is:

1. In a manually operable computer, a plurality of indicating means each of which indicates different degrees of a given variable factor, said plurality of indicating means respectively indicating different variable factors, and each indicating means having a manually movable indicia-carrying member carrying a given number of indicia respectively indicative of different degrees of a variable factor, the number of indicia of any one indicating means being identical with and matching the indicia of all of the other indicating means, a plurality of labelling means respectively situated adjacent said plurality of indicating means for respectively indicating said variable factors, and said plurality of indicating means respectively having indicating locations to which selected indicia are displaced, respectively, so that at said locations a series of indicia will be visible indicating various degrees of the variable factors, so that it is possible to determine at said locations which degree of the several factors predominates over all of the other degrees thereof, and means directing further steps to be taken in accordance with that degree of all of said factors which predominates over the others.

2. The combination of claim 1 and wherein said different degrees of each indicator means are respectively indicated by areas of different colors.

3. The combination of claim 2 and wherein said means for indicating the directions to be followed in accordance with that color which predominates itself having areas of said different colors indicating different procedures for the several latter areas, respectively.

4. The combination of claim 1 and wherein each indicator means extends horizontally along a substantially straight line, and a plurality of indicator means being located one over the other to provide a substantially vertical row of indicator means with each indicator means itself extending horizontally in the row.

5. The combination of claim 4 and wherein the plurality of indicator means respectively include a plurality of elongated strips and guide means guiding said strips for longitudinal shifting movement, said guide means being stationary and carrying said plurality of labelling means over said strips, respectively, while said strips are each provided with a series of different colors longitudinally distributed therealong and respectively indicating the different degrees, said guide means including a series of openings at which selected colored areas of the several strips are located to indicate the degrees of the different factors, so that said openings of said guide means form said indicating locations where it is possible to count that one of the degrees of all of the variables which predominates over the others.

6. The combination of claim 5 and wherein said colored areas all carry printed indicia indicating the particular degrees.

7. The combination of claim 6 and wherein said guide means is situated in an inclined plane and supports said elongated strips for horizontal movement in said plane.

8. The combination of claim 7 and wherein said strips having an initial position all located in alignment one above the other to one side of said openings of said guide means, and said openings being arranged also in a vertical row one above the other.

9. The combination of claim 8 and wherein said means for indicating directions in accordance with that color which predominates includes a plurality of colored areas situated on said guide means and corresponding to the colors of said strips while indicating different procedures to be taken for the several colors.

10. The combination of claim 9 and wherein said factors relate to cosmetic factors such as color of eyes, natural coloring, response to sun, surface facial lines, etc., and said means for giving directions in accordance with a predominating color indicating a type of makeup to be used in accordance with that color which predominates at said indicating locations.